United States Patent [19]

Robbins et al.

[11] Patent Number: 4,799,727
[45] Date of Patent: Jan. 24, 1989

[54] FOLDING AUTOMOBILE CONVERTIBLE TOP AND REAR WINDOW ASSEMBLY HAVING A FLEXIBLE HINGE

[75] Inventors: Mark R. Robbins, Santa Monica; Douglas W. Robbins, Malibu; Roy P. Agosta, Southgate, all of Calif.

[73] Assignee: Robbins Auto Top Co., Inc., Santa Monica, Calif.

[21] Appl. No.: 37,114

[22] Filed: Apr. 10, 1987

Related U.S. Application Data

[63] Continuation of Ser. No. 781,145, Sep. 27, 1985, abandoned.

[51] Int. Cl.⁴ ............................................. E05D 1/02
[52] U.S. Cl. ................................. 296/107; 296/146; 16/225; 16/382; 16/385
[58] Field of Search ............... 16/224, 225, 382, 385, 16/DIG. 13; 49/381, 383; 296/107, 146

[56] References Cited

U.S. PATENT DOCUMENTS

| | | | |
|---|---|---|---|
| 3,155,424 | 11/1964 | Bauer | 296/107 |
| 3,388,611 | 6/1968 | Clary et al. | 16/225 X |
| 3,806,188 | 4/1974 | Tantlinger | 16/225 |
| 4,296,524 | 10/1981 | Horholt et al. | 16/225 |
| 4,363,191 | 12/1982 | Morgan | 16/225 |
| 4,563,381 | 1/1986 | Woodland | 16/225 |
| 4,584,216 | 4/1986 | Kenworthy et al. | 16/DIG. 13 |

FOREIGN PATENT DOCUMENTS 1158281 12/1983 Canada .................. 296/146

OTHER PUBLICATIONS

*Outwater Plastics Catalog*, pp. 19–21, 1981.

*Primary Examiner*—Fred Silverberg
*Attorney, Agent, or Firm*—Kelly, Bauersfeld & Lowry

[57] ABSTRACT

An improved hinge is provided for interconnecting window panes or the like, wherein the hinge is particularly adapted for use in a folding rear window of an automotive vehicle having a fold-down convertible top. The hinge comprises an elongated one-piece extrusion of flexible elastomer material shaped to define a back-to-back pair of generally U-shaped channel strips joined together by a short hinge segment along one side thereof. The channel strips are respectively secured with substantial bond area to adjacent edges of a pair of window panes, with the hinge segment acccommodating relatively free swinging movement of the panes betweeen a normal position lying generally in a common plane and a folded or stacked position for compact storage.

2 Claims, 1 Drawing Sheet

FOLDING AUTOMOBILE CONVERTIBLE TOP AND REAR WINDOW ASSEMBLY HAVING A FLEXIBLE HINGE

This application is a continuation of application Ser. No. 781,145, filed Sept. 27, 1985, now abandoned.

BACKGROUND OF THE INVENTION

This invention relates generally to window hinges for foldably supporting adjacent panes of window glass or the like. More particularly, this invention relates to an improved yet relatively simple and lightweight hinge for foldably interconnecting adjacent window panes used, for example, in a rear window of an automotive vehicle having a fold-down convertible top.

Automotive vehicles having a so-called convertible top are well known in the art, wherein the vehicle is provided with a folding top or roof structure formed typically of a canvas material. The convertible top is designed for relatively rapid deployment between a normal "up" position to provide a roof structure covering a passenger compartment or a "down" position normally folded and stored, for example, behind the vehicle seat. In the "up" position, the top protcts occupants from rain, wind, and the like, whereas in the "down" position, the vehicle occupants may enjoy direct exposure to fresh air, sun, etc.

In the past, convertible tops for automotive vehicles have traditionally included a transparent rear window as part of the folding structure to accommodate normal visibility to the rear of the vehicle. In many instances, this rear window has been formed from a flexible plastic material which, over time, undesirably tends to become brittle and crack, and loose transparency due to its exposure to sun, wind, rain, and the like. As a result, it is necessary to replace the plastic window on a relatively frequent basis.

In recognition of the disadvantages of flexible plastic windows, tempered glass window panes have been proposed for use in convertible tops for automotive vehicles. However, to achieve the requisite compact storage of the entire convertible top in the "down" position, it has been necessary to provide at least two glass window panes which are foldably interconnected by a central horizontal hinge in the form of an elongated bead of a silicon rubber-based adhesive material or the like bonded between adjacent edges of the window panes. Such hinge structures unfortunately have exhibited an undesirable tendency to crack, tear, or otherwise separate from the window panes due to the combined effects of exposure to weather conditions and high stresses experienced in the folded condition.

There exists, therefore, a significant need for an improved yet relatively simple window hinge for foldably interconnecting adjacent window panes of the type used to form a folding rear window for an automotive vehicle convertible top. The present invention fulfills these needs and provides further related advantages.

SUMMARY OF THE INVENTION

In accordance with the invention, an improved window hinge is provided for interconnecting adjacent edges of a pair of window panes or the like as used, for example, to form a transparent rear window for a fold-down convertible top in an automotive vehicle. The improved hinge comprises a relatively simple, lightweight, and cost-efficient unitary extrusion of an elastomer material selected for its relatively high flexibility and resistance to deterioration upon exposure to weather conditions. The hinge is shaped for securement to the adjacent edges of the window pane with a relatively high bond area and further to accommodate relatively low stress swinging movement of the panes between folded and unfolded positions.

In the preferred form of the invention, the improved window hinge comprises an elongated one-piece extrusion shaped to define a pair of back-to-back, generally U-shaped channel strips respectively defining an elongated pair of recessed seats for reception of adjacent marginal edges of the window panes. Each channel strip comprises a base wall cooperating with a pair of relatively short sidewalls to define the associated window-receiving seat. At one common side of the channel strips, the sidewalls are joined together by a relatively short hinge segment which spaces the base walls of the two channel strips a short distance from each other and provides additional elastomer material accommodating swinging movement of the channel strips with respect to one another.

In use, the adjacent marginal edges of a pair of window panes are received into the respective seats defined by the two channel strips, with a selected adhesive material being provided for securely bonding the pane edges to the inboard faces of the base and sidewalls of the associated channel strips. In this configuration, the hinge provides a one-piece structure accommodating relatively free swinging movement of the panes between a noram or unfolded position lying substantially in a common plane, for example, when a convertible top of an automotive vehicle is in an "up" position, or to a folded or stacked position with the channel strips lying side-by-side, for example, when the convertible top is in a "down" position. The hinge segment between the channel strips accommodates the majority of folding stresses without transmission of those stresses to the bond interface with the window pane, thereby permitting folding and unfolding movement without significant risk of the panes separating from the hinge.

Other features and advantages of the present invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
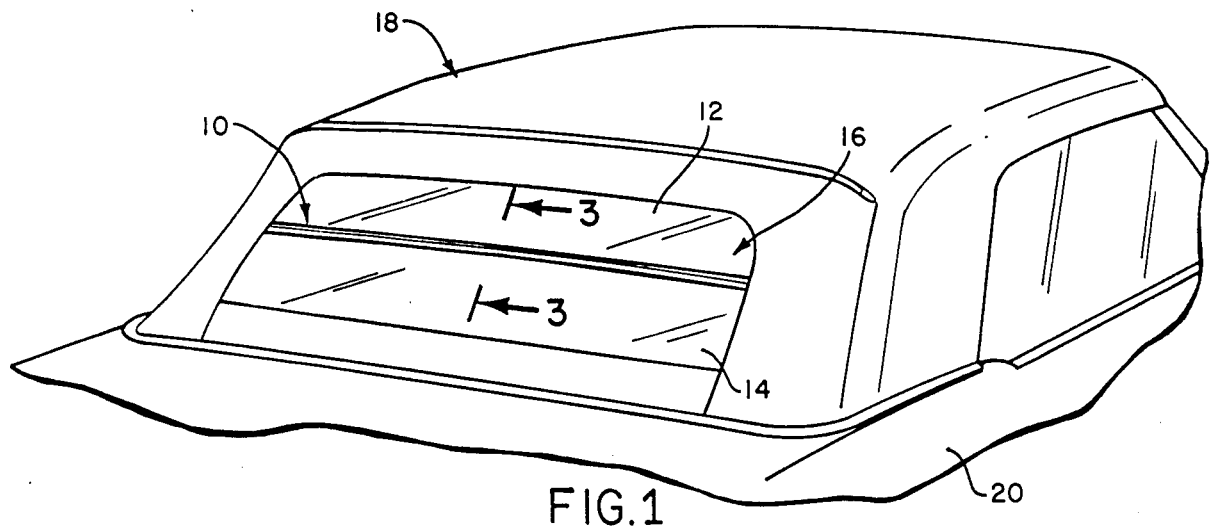
FIG. 1 is a fragmented perspective view illustrating a window hinge embodying the novel features of the invention and incorporated into a folding rear window of a fold-down convertible top for an automotive vehicle, with the convertible top being shown in an unfolded or "up" position.

As shown in the exemplary drawings, an improved window hinge referred to generally by the reference numeral 10 is provided for flexible interconnection of a pair of window panes 12 and 14 as used, for example, to form a folding rear window 16 of a fold-down convertible top 18 for an automotive vehicle 20 or the like.

Figure 3:
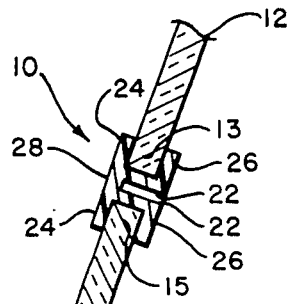
FIG. 3 is an enlarged fragmented vertical section taken generally on the line 3—3 of FIG. 1.
Figure 4:
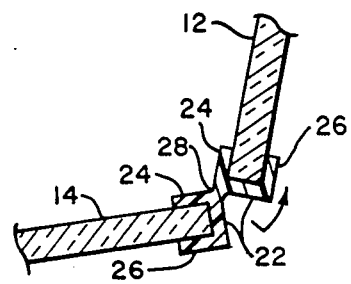
FIG. 4 is an enlarged fragmented vertical section taken generally on the line 4—4 of FIG. 2.
Figure 5:
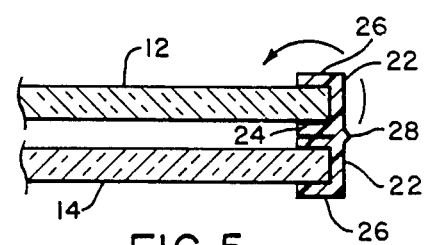
FIG. 5 is another fragmented vertical section similar to FIGS. 3 and 4 but illustrating the rear window in a folded or "down" position.
Figure 6:
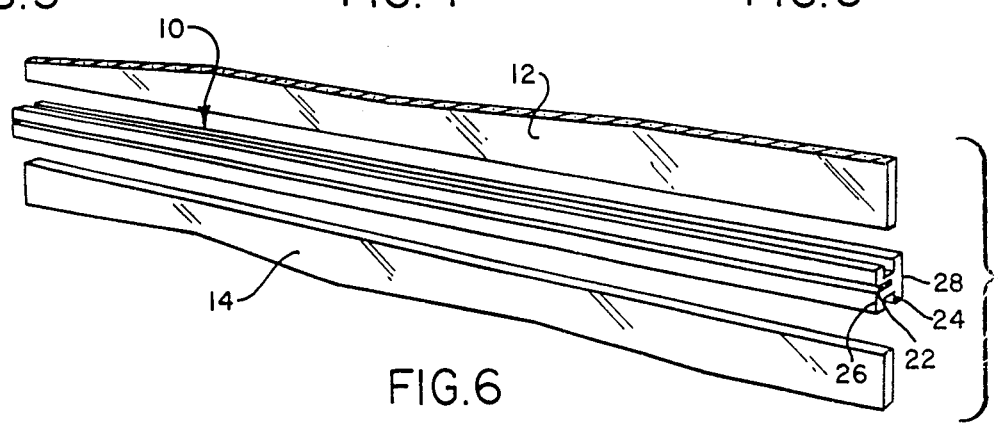
FIG. 6 is an enlarged fragmented exploded perspective view illustrating assembly of the window hinge

The improved window hinge 10 of the present invention provides a relatively simple, lightweight, and low profile structure for secure attachment to adjacent marginal edges 13 and 15 of the window panes 12 and 14 (FIGS. 3-5). This secure attachment of the hinge to the window pane edges 13 and 15 provides substantial bond or attachment area to minimize risk of separation from the window pane. Moreover, the improved hinge 10 is designed to accommmodate stresses during folding and unfolding of the window panes with little or no transfer of those stresses to the bond interface with the panes, thereby insuring a secure and long-lived hinge structure.

Figure 2:
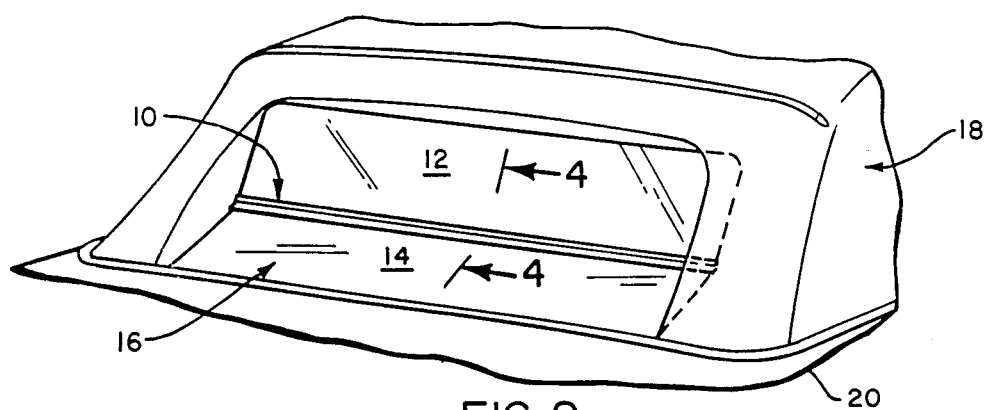
FIG. 2 is a fragmented perspective view similar to FIG. 1 but illustrating the convertible top in a partially folded position.

As shown generally in FIGS. 1 and 2, the improved window hinge 10 is particularly adapted for use in the rear window 16 of a fold-down convertible top 18 for an automotive vehicle. Such convertible top 18 is typically formed form a foldable canvas material or the like supported upon a folding frame (not shown) for deployment in an unfolded or "up" condition, provided an enclosing top or roof extending over a passenger compartment for the vehicle 20. Alternately, the convertible top 18 can be moved quickly and easily to a folded or "down" condition for relatively compact, substantially concealed storage in a compartment located, for example, behind passenger seats for the vehicle. FIG. 2 illustrates the top in a partially folded condition.

The window panes 12 and 14 form a transparent rear window 16 for the convertible top, wherein the rear window is designed to fold with the top 18 for compact, concealed storage in the "down" condition. To achieve the necessary degree of compact folding, the window hinge 10 provides a central horizontally oriented separation between the two panes 12 and 14 to accommodate relative swinging movement therebetween as the convertible top is moved from the "up" position to the "down" position, or vice versa.

As shown in more detail in FIGS. 3-6, the window hinge 10 comprises an elongated one-piece extrusion or hined connection between the adjacent marginal edges 13 and 15 of the two window panes. The hinge 10 is constructed from a lightweight and relatively flexible elastomer, such as a heat-curable silicon-based resin. Alternately, other flexible elastomer material may be used, such as polypropylene, polyethylene, vinyls, ABS, and the like. The preferred elastomer material will be substantially or at least partially transparent to minimize obstruction of rearward visibility from within the vehicle, although nontransparent material of any selected color may be used, if desired.

The hinge 10 is shaped to include an elongated pair of channel strips each having a generally U-shaped cross section extending the length of the window and oriented normally in the back-to-back relation. More specifically, each channel strip includes a base wall 22 joined along its opposite longitudinal margins to an upstanding pair of sidewalls 24 and 26, with the sidewalls having a height generally equal to the base wall width. The base wall 22 and associated sidewalls 24 and 26 of each channel strip cooperatively define an elongated track or seat for seated reception of the marginal edge 13 or 15 of the associated window pane. An adhesive material, such as an appropriate silicon-based adhesive or the like is applied to the inboard faces of the base and sidewalls to obtain secure bonding thereof to the adjacent window pane. With this geometry, a substantial bond area is achieved with respect to each window pane, wherein this bond area extends continuously over the inboard face area of the base and sidewalls.

The two channel strips of the window hinge 10 are separated a short distance from each other by a short hinge segment 28. This hinge segment 28 is located along one side margin of the hinge conveniently as a common continuation of the two sidewalls 24 at one side of the hinge.

As shown in a normal unstressed condition in FIG. 3, with the convertible 18 in an unfolded or "up" position, the window hinge 10 supports the two window panes 12 and 14 in an unfolded condition lying substantially edge to edge in a common plane. The sidewalls 24 and the intermediate hinge segment 28 are disposed on the exterior of the rear window 16 to accommodate relative inward folding movement of the adjacent pane marginal edges 13 and 15 when the convertible top 18 is moved toward the folded or "down" position. During this movement, as viewed in sequence in FIGS. 4 and 5, the window panes 12 are moved toward a folded condition stacked one upon the other with the channel strips oriented in side-by-side relation. Importantly, folding stresses during this movement are accommodated substantially entirely by the short hinge segment 28 which functions to isolate the folding stresses from the bond interfaces between the channel strips and the window panes. Folding movement is thus accomplished quickly and easily and may be repeated over a substantial period of time without significant risk of separation of either window pane from the associated channel strip. Unfolding movement of the window plane is similarly accomplished in a reverse manner as the convertible top is moved from the "down" position to the "up" position (FIG. 1).

The window hinge 10 of the present invention thus provides a relatively simple structure for securely and foldably interconnecting window panes of glass or the like. Folding stresses are substantially isolated from the attachment interface between the hinge and the panes to provide a long-lived hinge which is highly resistant to mechanical force deterioration.

A variety of modifications and improvements to the improved window hinge of the invention are believed to be apparent to those skilled in the art. Accordingly, no limitation of the invention is intended by way of the description herein, except as set forth in the appended claims.

What is claimed is:

1. A folding automotive vehicle convertible top and rear window assembly, comprising:
   a pair of substantially inflexible window panes;
   an automotive vehicle convertible top including means for foldably supporting said window panes with a marginal edge of one of said panes disposed generally adjacent a marginal edge of the other of said panes, said convertible top being movable between a folded stored position and an unfolded upright position;

an elongated one-piece hinge member of a flexible heat curable silicon-based resin elastomer material having a cross-section defining a pair of generally U-shaped channel strips each defined by an elongated base wall and a pair of generally parallel sidewalls upstanding from the opposite side margins of said base wall, said pair of channel strips forming a respective pair of elongated recessed seats for respective reception of and connection to the adjacent marginal edges of the pair of window panes, and a hinge segment extending between said channel strips as a common continuation of said sidewalls at one side of said channel strips and spacing said channel strips from each other, said sidewalls of each of said channel strips having a height generally equal to the width of said base wall of that channel strip, and said hinge segment having a size and shape to permit relative swinging movement of said channel strips through approximately 180° between unfolded and folded positions substantially without significant swinging movement beyond said unfolded and folded positions; said hinge segment being of substantially equal thickness to said sidewalls and forming with the two sidewalls a substantially planar top surface; and adhesive means for connecting said adjacent marginal edges of said panes to said channel strips within said seat, said adhesive means comprising an adhesive material for bonding the inboard faces of said base wall and said sidewalls of each of said channel strips to a respective one of the marginal edges of said panes;

said hinge segment having sufficient flexibility to accommodate relative swinging movement of said panes between said unfolded position with said seats of said channel strips opening generally in opposite directions when said top is in said unfolded upright position and said folded position with said seats opening generally in the same direction when said top is in said folded stored position, said hinge member substantially isolating stresses incurred during such swinging movement from the connection interfaces between said channel strips and said panes.

2. The folding window assembly of claim 1 wherein said hinge segment has a normal unstressed configuration with said channel strips disposed generally back-to-back.

* * * * *